US011961157B2

(12) United States Patent
Shao et al.

(10) Patent No.: US 11,961,157 B2
(45) Date of Patent: Apr. 16, 2024

(54) METHODS FOR COMMUNAL FACILITIES MANAGEMENT IN SMART CITIES BASED ON THE INTERNET OF THINGS, SYSTEMS, AND MEDIUMS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/057,732

(22) Filed: Nov. 21, 2022

(65) Prior Publication Data
US 2023/0083460 A1   Mar. 16, 2023

(30) Foreign Application Priority Data
Oct. 21, 2022   (CN) .......................... 202211291592.8

(51) Int. Cl.
*G06Q 50/26* (2012.01)
*G05D 1/00* (2006.01)
(Continued)

(52) U.S. Cl.
CPC .......... *G06Q 50/26* (2013.01); *G05D 1/0219* (2013.01); *G06V 10/82* (2022.01); *G16Y 20/10* (2020.01); *G16Y 40/10* (2020.01)

(58) Field of Classification Search
CPC ...... G06Q 50/26; G06Q 50/08; G06Q 10/103; G06Q 30/018; G06Q 50/10; G06Q 10/10;
(Continued)

(56) References Cited

U.S. PATENT DOCUMENTS

2019/0343355 A1*  11/2019  Han .................... A47L 9/2842
2022/0118953 A1*   4/2022  Fritz .................. B25J 11/0085
(Continued)

FOREIGN PATENT DOCUMENTS

CN       106529723 A       3/2017
CN       108831337 A      11/2018
(Continued)

OTHER PUBLICATIONS

Zhiguo Fan and Yanjun Fan 2019 IOP Conf. Ser.: Earth Environ. Sci. 300 032070 (Year: 2019).*
(Continued)

*Primary Examiner* — Maria C Santos-Diaz
(74) *Attorney, Agent, or Firm* — METIS IP LLC

(57) ABSTRACT

The present disclosure provides a method for communal facilities management in a smart city based on an Internet of Things. The method includes: obtaining first cleanliness information of the communal facilities in a target area at a first time point and weather information, construction information, factory information, and traffic information of the target area during a target time period; determining second cleanliness information of the communal facilities at the second time point based on the first cleanliness information, the weather information, the construction information, the factory information, and the traffic information; determining, based on the second cleanliness information, target cleanliness information of the communal facilities at the second time point; determining the communal facilities as target communal facilities when the target cleanliness information of the communal facilities satisfies a preset condition, and determining cleaning instructions for cleaning the target communal facilities; and sending the cleaning instructions to an object platform.

6 Claims, 7 Drawing Sheets

(51) Int. Cl.
  *G05D 1/02* (2020.01)
  *G06V 10/82* (2022.01)
  *G16Y 20/10* (2020.01)
  *G16Y 40/10* (2020.01)
(58) Field of Classification Search
  CPC ........... G06Q 10/06395; G06Q 50/163; G06Q 10/00; G06Q 90/00; G06Q 50/12; G06Q 50/16; G06Q 10/20; G06Q 50/06; G06Q 30/0242; G06Q 50/04; G06Q 10/0639; G06Q 30/0635; G06Q 30/0637; G06Q 10/06315; G06Q 30/0205; G06Q 10/0631; G06Q 10/06393; G06Q 10/087; G06Q 40/04; B08B 1/002; B08B 13/00; B08B 15/04; B08B 1/04; B08B 1/008; B08B 3/02; B08B 5/02; B08B 5/04; B08B 1/006
  See application file for complete search history.

(56) References Cited

U.S. PATENT DOCUMENTS

| | | | |
|---|---|---|---|
| 2023/0057564 A1* | 2/2023 | Shao | G06V 10/70 |
| 2023/0104868 A1* | 4/2023 | Shao | G08G 1/22 |
| | | | 701/533 |
| 2023/0125033 A1* | 4/2023 | Shao | G06Q 10/20 |
| | | | 705/7.22 |

FOREIGN PATENT DOCUMENTS

| | | | | |
|---|---|---|---|---|
| CN | 109394073 | A | | 3/2019 |
| CN | 109764474 | A | | 5/2019 |
| CN | 109787552 | A | | 5/2019 |
| CN | 109787552 | A | * | 5/2019 |
| CN | 110820644 | A | | 2/2020 |
| CN | 110820644 | A | * | 2/2020 |
| CN | 110837984 | A | | 2/2020 |
| CN | 112726109 | A | | 4/2021 |
| CN | 113393177 | A | | 9/2021 |
| CN | 113393177 | A | * | 9/2021 |
| CN | 114073457 | A | | 2/2022 |
| CN | 114584060 | A | | 6/2022 |
| CN | 11484239 | | * | 7/2022 |
| CN | 115131737 | A | | 9/2022 |
| CN | 115236771 | A | * | 10/2022 |
| CN | 115630950 | A | * | 1/2023 |
| EP | 3217541 | A1 | | 9/2017 |
| WO | 2017120883 | A1 | | 7/2017 |
| WO | WO-2022254880 | A1 | * | 12/2022 |

OTHER PUBLICATIONS

Veronika Smejkalová, Radovan Šomplák, Vlastimír Nevrlý, Boris Burcin, Tomáš Kučera, Trend forecasting for waste generation with structural break, Journal of Cleaner Production, vol. 266, 2020 (Year: 2020).*

Omara, A., Gulen, D., Kantarci, B., & Oktug, S. F. (2018). Trajectory-assisted municipal agent mobility: A sensor-driven smart waste management system. Journal of Sensor and Actuator Networks, 7(3), n/a. doi:http://dx.doi.org/10.3390/jsan7030029 (Year: 2018).*

First Office Action in Chinese Application No. 202211291592.8 dated Dec. 7, 2022, 20 pages.

Notification to Grant Patent Right for Invention in Chinese Application No. 202211291592.8 dated Jan. 5, 2023, 7 pages.

* cited by examiner

300

```
┌─────────────────────────────────────────────────┐
│ Obtaining, by the management platform, the first cleanliness    │ ⎯310
│ information of the communal facilities in the target area at the │
│ first time point and the weather information, construction       │
│ information, factory information, and traffic information of the │
│ target area during the target time period                        │
└─────────────────────────────────────────────────┘
                          │
                          ▼
┌─────────────────────────────────────────────────┐
│ Determining, by the management platform, the second             │ ⎯320
│ cleanliness information of the communal facilities at the second │
│ time point based on the first cleanliness information, the       │
│ weather information, the construction information, the factory   │
│ information, and the traffic information                         │
└─────────────────────────────────────────────────┘
                          │
                          ▼
┌─────────────────────────────────────────────────┐
│ Determining, by the management platform, the target             │ ⎯330
│ cleanliness information of the communal facilities at the second │
│ time point based on the second cleanliness information           │
└─────────────────────────────────────────────────┘
                          │
                          ▼
┌─────────────────────────────────────────────────┐
│ When the target cleanliness information of the communal          │ ⎯340
│ facilities meets the preset conditions, determining, by the      │
│ management platform, the communal facilities as the target       │
│ communal facilities and determining the cleaning instructions    │
│ for cleaning the target communal facilities                      │
└─────────────────────────────────────────────────┘
                          │
                          ▼
┌─────────────────────────────────────────────────┐
│ Sending, by the management platform, cleaning instructions       │ ⎯350
│ to the object platform through the sensor network platform,      │
│ and the object platform configured to clean the target           │
│ communal facilities                                              │
└─────────────────────────────────────────────────┘
```

METHODS FOR COMMUNAL FACILITIES MANAGEMENT IN SMART CITIES BASED ON THE INTERNET OF THINGS, SYSTEMS, AND MEDIUMS

CROSS-REFERENCE TO RELATED APPLICATIONS

This application claims priority to Chinese Patent Application No. 202211291592.8, filed on Oct. 21, 2022, the entire contents of which are incorporated herein by reference.

TECHNICAL FIELD

The present disclosure relates to field of the Internet of Things, and in particular, to a method for communal facilities management in a smart city based on the Internet of Things, system and medium.

BACKGROUND

In urban greening management, there are limitations in road and wall cleaning, green plant cleaning, and other work only through manual recognition. It is one of the current development directions to realize intelligence and Internet of Things integration in municipal management and urban greening field. Therefore, it is hoped that a method for communal facilities management in a smart city based on the Internet of Things may be provided, which can automatically generate a cleaning plan of the communal facilities based on information such as communal facilities images and the ash deposit degree of communal facilities, and realize the integration of the Internet of Things so that different units or departments can cooperate with each other to start the cleaning of communal facilities quickly and reasonably.

SUMMARY

According to one or more embodiments in the present disclosure, a method for communal facilities management in a smart city based on an Internet of Things is provided. The method is applied to a management platform. The method includes: obtaining first cleanliness information of the communal facilities in a target area at a first time point and weather information, construction information, factory information, and traffic information of the target area during a target time period, the first time point being a time point when the communal facilities were cleaned for last time, and the target time period being a time period between a first time point and a second time point; determining second cleanliness information for the communal facilities at the second time point based on the first cleanliness information, the weather information, the construction information, the factory information, and the traffic information; determining, based on the second cleanliness information, target cleanliness information of the communal facilities at the second time point; determining the communal facilities as target communal facilities when the target cleanliness information of the communal facilities satisfies a preset condition, and determining cleaning instructions for cleaning the target communal facilities; and sending the cleaning instructions to an object platform through a sensor network platform, the object platform configured to clean the target communal facilities.

According to one or more embodiments in the present disclosure, a system for communal facilities management in a smart city based on an Internet of Things is provided, including a user platform, a service platform, a management platform, a sensor network platform, and an object platform. The management platform is configured to: obtain first cleanliness information of the communal facilities in a target area at a first time point and weather information, construction information, factory information, and traffic information of the target area during a target time period, the first time point being a time point when the communal facilities were cleaned for last time, and the target time period being a time period between a first time point and a second time point; determine second cleanliness information for the communal facilities at the second time point based on the first cleanliness information, the weather information, the construction information, the factory information, and the traffic information; determine, based on the second cleanliness information, target cleanliness information of the communal facilities at the second time point; determine the communal facilities as target communal facilities when the target cleanliness information of the communal facilities satisfies a preset condition, and determine cleaning instructions for cleaning the target communal facilities; and send the cleaning instructions to an object platform through a sensor network platform, the object platform configured to clean the target communal facilities.

According to one or more embodiments in the present disclosure, a non-transitory computer-readable storage medium is provided, in which a computer instruction is stored, when the computer instruction is executed by a computer, the computer implements the above method for communal facilities management in a smart city based on an Internet of Things.

BRIEF DESCRIPTION OF THE DRAWINGS

The present disclosure will be further described in the form of exemplary embodiments, which will be described in detail by the accompanying drawings. These embodiments are not limiting, in these embodiments, the same number denotes the same structure, wherein:

FIG. 3 is an exemplary flowchart illustrating a method for communal facilities management in a smart city based on the Internet of Things according to some embodiments of the present disclosure;

DETAILED DESCRIPTION

Figure 1:
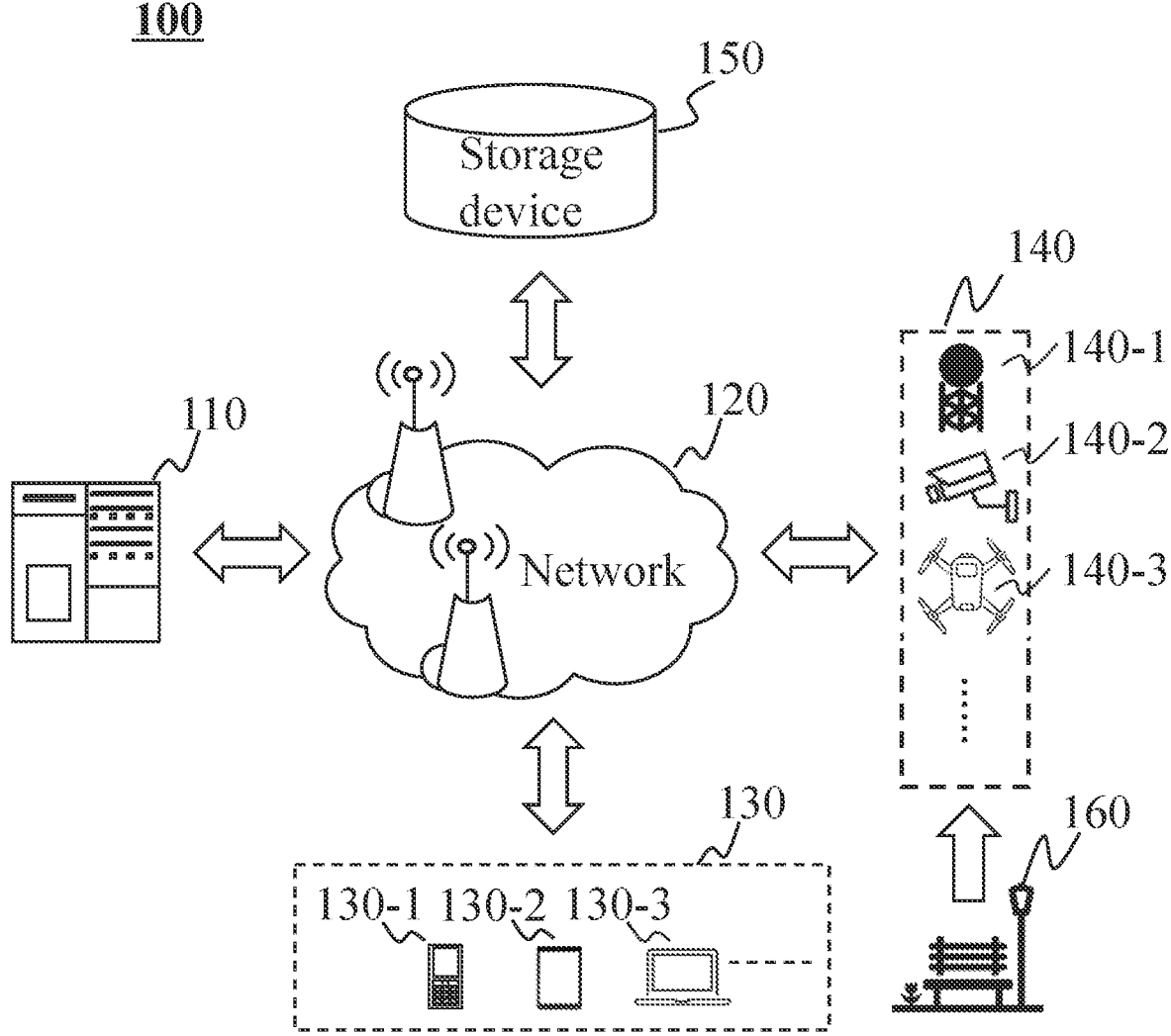
FIG. 1 is a schematic diagram illustrating an application scenario of a system for communal facilities management in a smart city based on the Internet of Things according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections, or assemblies of different levels in ascending order. However, if other words may achieve the same purpose, the words may be replaced by other expressions.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements may not constitute an exclusive list, and the method or device may further include other steps or elements.

Flowcharts are used throughout the present disclosure to illustrate the operations performed by the system according to embodiments of the present disclosure. It should be understood that the preceding or following operations are not necessarily performed in precise order. Instead, the individual steps may be processed in reverse order or simultaneously. It is also possible to add other operations to these processes or to remove a step or steps of operations from these processes.

FIG. 1 is a schematic diagram illustrating an application scenario of a system for communal facilities management in a smart city based on the Internet of Things according to some embodiments of the present disclosure.

As shown in FIG. 1, the application scenario 100 may include a server 110, a network 120, a terminal device 130, a data collection device 140, a storage device 150, and communal facilities 160.

In some embodiments, the application scenario 100 may determine a cleaning instruction for cleaning communal facilities by implementing a method and/or system for communal facilities management in a smart city based on an Internet of Things disclosed in the present disclosure. For example, in an exemplary application scenario, when a cleaning instruction for cleaning the communal facilities facility needs to be determined, first cleanliness information of the communal facilities facility in the target area at a first time point and the weather information, construction information, factory information, and traffic information of the target area during the target time period are obtained through the data collection device 140. The above information is then sent to the server 110. The server 110 determines the second cleanliness information of the communal facilities at the second time point based on the above information, and determines the target cleanliness information of the communal facilities at the second time point based on the second cleanliness information. When the target cleanliness information of the communal facilities satisfies a preset condition, the server 110 determines the communal facilities as the target communal facilities, and determines a cleaning instruction for cleaning the target communal facilities. More descriptions regarding the target area, the communal facilities, the first time point, the target time period, and the second time point may be found in FIG. 3 and its related descriptions.

The server 110 and the terminal device 130 may be connected through the network 120, and the server 110 may be connected to the storage device 150 through the network 120. The server 110 may include a processing device, and the processing device may be configured to perform the method for communal facilities management in the smart city based on the Internet of Things described in some embodiments of the present disclosure. The network 120 may connect the components of the application scenario 100 and/or connect the system to external resource components. Storage device 150 may be configured to store data and/or instructions. For example, storage device 150 may store the first cleanliness information of the communal facilities in the target area at a first time point and weather information, construction information, factory information, and traffic information of the target area during the target time period. The storage device 150 may be directly connected to the server 110 or be inside the server 110. The terminal device 130 refers to one or more terminal devices or software. In some embodiments, the terminal device 130 may receive cleaning instructions for cleaning the communal facilities sent by a processing device and present the cleaning instructions to a user. Exemplarily, terminal device 130 may include one of the mobile devices 130-1, tablet computer 130-2, laptop computer 130-3, etc., or other devices with input and/or output capabilities, or any combination thereof. The data collection device 140 may be configured to collect data/information related to the communal facilities 160. Exemplarily, weather collection device 140-1 may obtain weather information of the target area during the target time period, a camera device 140-2, and a drone 140-3 may obtain a first image of the communal facilities at a first time point. The communal facilities 160 may be a public building or equipment used by the public. For example, the communal facilities 160 may include roads, bridges, green belts, parks, sports stadiums, and their related facilities.

It should be noted that the application scenario 100 is provided for illustrative purposes only and is not intended to limit the scope of the present disclosure. For those of ordinary skill in the art, a variety of modifications or variations may be made according to the description of the present disclosure. For example, the application scenario 100 may also include a database. Another example is that the application scenario 100 may be implemented on other devices to achieve similar or different functions. However, the variations and modifications will not depart from the scope of the present disclosure.

The Internet of Things system is an information processing system that includes some or all of the user platform, service platform, management platform, sensor network platform, and object platform. The user platform is a functional platform to realize the obtaining of the perception information of the user and the generation of the control information. The service platform can realize connecting the management platform and user platform, and plays the function of sensing information service communication and control information service communication. The management platform may realize the planing and coordination of the connection and collaboration between the functional platforms (such as the user platform and service platform). The management platform aggregates the information of the Internet of Things operation system and may provide sensing management and control management functions for the Internet of Things operation system. The service platform may realize connecting the management platform and object platform, and plays the functions of sensing information service communication and control information service communication. The user platform is a functional platform to realize the obtaining of the perception information of a user and the generation of the control information.

The processing of information in the Internet of Things system may be divided into the processing of user perception information and the processing of control information. The control information may be information generated based on user perception information. In some embodiments, the control information may include user demand control information, and the user perception information may include user query information. The processing of the perception information is obtaining the perception information by the object platform and transmitting the perception information to the management platform through the sensor network platform. The user demand control information is then transmitted from the management platform to the user platform through the service platform, which further enables the control of sending prompt message.

Figure 2:
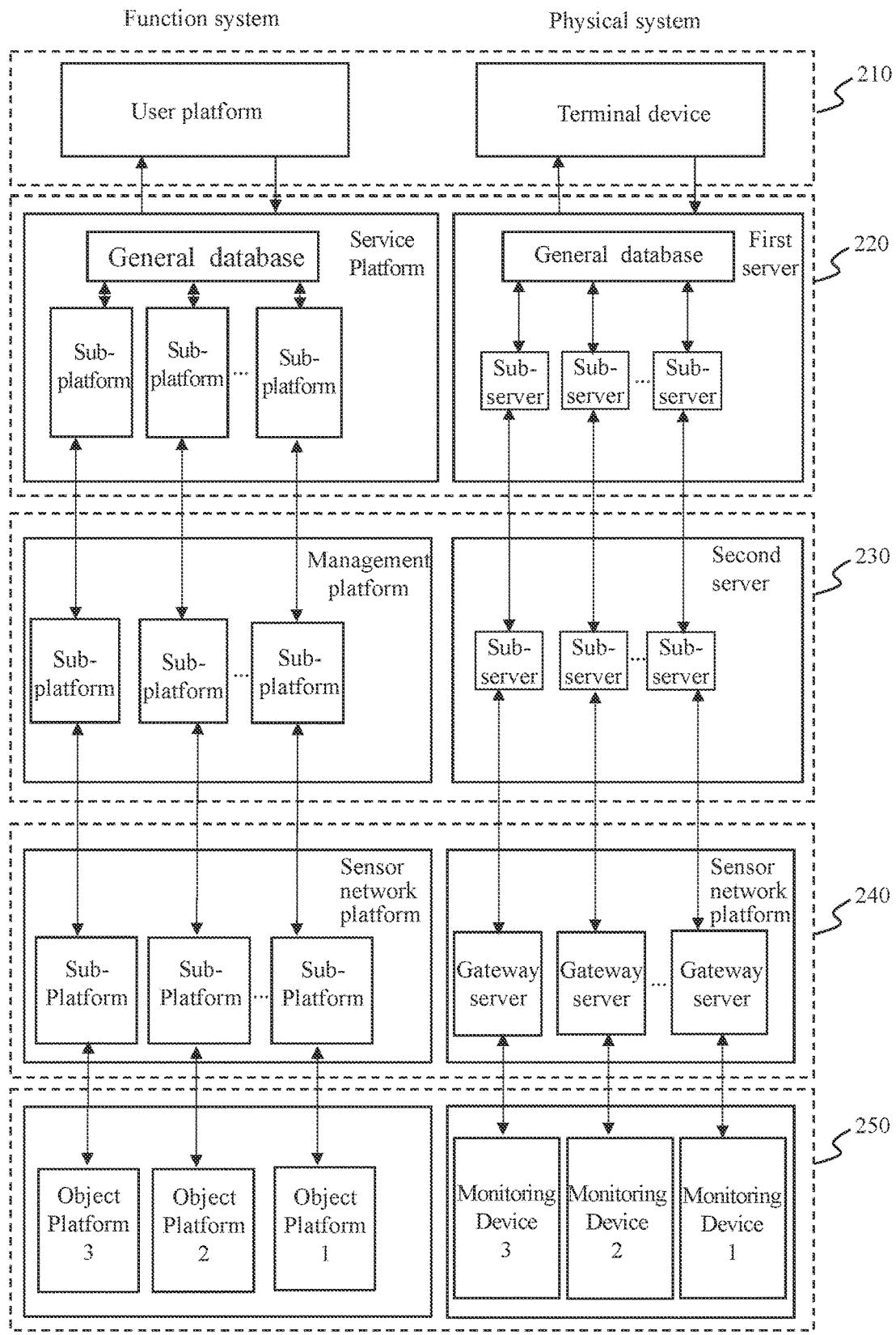
FIG. 2 is an exemplary platform structure diagram illustrating a system for communal facilities management in a smart city based on the Internet of Things according to some embodiments of the present disclosure.

FIG. 2 is an exemplary platform structure diagram illustrating a system for communal facilities management in a smart city based on the Internet of Things according to some embodiments of the present disclosure.

As shown in FIG. 2, a system for communal facilities management in the smart city based on the Internet of Things 200 may include a user platform 210, a service platform 220, a management platform 230, a sensor network platform 240, and an object platform 250. In some embodiments, the system for communal facilities management in the smart city based on the Internet of Things 200 may be part of or implemented by a server.

In some embodiments, the system for communal facilities management in the smart city based on the Internet of Things 200 may be applied to a variety of scenarios of communal facilities management in the smart city. In some embodiments, the system for communal facilities management in the smart city based on the Internet of Things 200 may obtain a query instruction based on a query requirement of the related information of communal facilities sent by a user, and obtain a query result based on the query instruction. In some embodiments, the system for communal facilities management in the smart city based on the Internet of Things 200 may determine the cleaning instructions of the communal facilities based on the first cleanliness information of the communal facilities in the target area at the first time point and the weather information, construction information, factory information, and traffic information of the target area during the target time period.

Various scenarios of the method for communal facilities management in a smart city based on the Internet of Things may include traffic section communal facilities cleaning scenarios, city communal facilities cleaning scenarios, indoor communal facilities cleaning scenarios, etc. It should be noted that the above scenarios are only examples and do not limit the specific application scenarios of the system for communal facilities management in the smart city based on the Internet of Things 200. Those skilled in the art may apply the system for communal facilities management in the smart city based on the Internet of Things 200 to any other suitable scenarios based on the content disclosed in this embodiment.

In some embodiments, the system for communal facilities management in the smart city based on the Internet of Things 200 may be applied to a traffic section communal facilities cleaning scenario. When applied to traffic section communal facilities cleaning scenario, the object platform may obtain traffic flow/people flow information of the traffic section. The management platform may determine traffic management measures based on the above information.

In some embodiments, the system for communal facilities management in the smart city based on the Internet of Things 200 may be applied to a city communal facilities cleaning scenario. When applied to a city communal facilities cleaning scenario, the object platform may obtain weather information related to the city. The management platform may predict the ash deposit degree of the communal facilities in the future time period based on the weather information.

In some embodiments, the system for communal facilities management in the smart city based on the Internet of Things 200 may be applied to indoor communal facilities cleaning scenarios. When applied to indoor communal facilities cleaning scenarios, the object platform may obtain information on construction, factory, etc., and the management platform may determine the cleaning plan based on the above information.

The following is an example of the system for communal facilities management in the smart city based on the Internet of Things 200 applied to a city communal facilities cleaning scenario, and a specific description of the system for communal facilities management in the smart city based on the Internet of Things 200 is given.

The user platform 210 may be a platform led by the user, which obtains user requirements and feeds information back to the user. In some embodiments, the user platform 210 may be configured as a terminal device, for example, a smart device such as a cell phone, computer, etc.

In some embodiments, the user may send the query instruction of related information of communal facilities to the service platform 220 through the user platform 210. The user may be a citizen user. In some embodiments, the user may also send information about the communal facilities to be cleaned to the service platform 220 through the user platform 210, and the user platform 210 may receive the related information of communal facilities and provide feedback to the user. For example, the user platform 210 may obtain input instructions of the user to query the related information of communal facilities through a terminal device. For example, the user platform 210 may feed the related information of communal facilities back to the user. The related information of communal facilities may include the first cleanliness information of the communal facilities at the first time point and the weather information, construction information, factory information, and traffic information of the target area during the target time period. More descriptions regarding the first cleanliness information, the weather information, the construction information, the factory information, and the traffic information may be found in FIG. 3 and its related descriptions.

The service platform 220 may be a platform that provides input and output services for users.

In some embodiments, the service platform 220 may be used for the interaction of information and/or data between the management platform 230 and the user platform 210. For example, the service platform 220 may receive query instructions of the related information of communal facilities sent by the user platform 210, store and send the query instructions to the management platform 230, and the service platform 220 may obtain the related information of communal facilities from the management platform 230, store and send the related information of communal facilities to the user platform 210.

In some embodiments, the service platform 220 may be provided with a service platform master database and a plurality of sub-platforms of the service platform. The sub-platforms of the service platform correspond to the sub-platforms of management platform one by one. The sub-platforms of the service platform may be divided based on urban areas. The plurality of sub-platforms of the service platform store and manage data of different classes or different receiving objects uploaded by the lower platforms respectively. The master database of the service platform aggregates the data of the plurality of sub-platforms of the service platform and then stores and transmits the data to the upper platform. For example, the sub-platforms of the service platform obtain the related information of communal facilities from the sub-platforms of the management platform, and each sub-platform of service platform stores and manages the obtained related information of communal facilities and upload the related information of communal facilities to the master database of the service platform. The master database of the service platform aggregates and stores the data of each sub-platforms of the service platform, and then transmits the data to the user platform 210. At this time, the data uploaded to the master database of the service platform may include the related information of communal facilities of the whole city.

The management platform 230 may refer to the Internet of Things platform that arranges and coordinates the connection and collaboration among functional platforms and provides perception management and control management.

In some embodiments, the management platform 230 may be used for information and/or data processing. For example, management platform 230 may be configured to process first cleanliness information, weather information, construction information, factory information, and traffic information of target area in response to the query instructions of the user to determine cleaning instructions of the communal facilities.

In some embodiments, the management platform 230 may also be used for information and/or data interaction between the service platform 220 and the sensor network platform 240. For example, the management platform 230 may receive the query instructions of the related information of communal facilities sent by the service platform 220, store and send the query instructions to the sensor network platform 240. The management platform 230 may obtain monitoring data of the target area from the sensor network platform 240, store and send the monitoring data to the service platform 220.

In some embodiments, the management platform 230 is provided with a plurality of sub-platforms of the management platform, and the sub-platforms of the management platform may correspond to the sub-platforms of the sensor network platform one by one. Each sub-platform of management platform stores and processes the monitoring data of the target area uploaded by the sub-platform of the corresponding sensor network platform respectively, and uploads the related information of communal facilities obtained after processing to the sub-platform of the corresponding service platform.

In some embodiments, the management platform 230 may be configured to obtain first cleanliness information of communal facilities in a target area at a first time point and weather information, construction information, factory information, and traffic information of the target area during a target time period. The first time point is the time point when communal facilities were cleaned for last time, and the target time period is the time period between the first time point and a second time point. The management platform 230 determines, based on the first cleanliness information, weather information, construction information, factory information, and traffic information, second cleanliness information of communal facilities at the second time point, determines, based on the second cleanliness information, determines target cleanliness information of communal facilities at the second time point, determines communal facilities as the target communal facilities when target cleanliness information of communal facilities meets a preset condition, determines cleaning instructions for cleaning target communal facilities, and sends the cleaning instructions through a sensor network platform to an object platform, and object platform is configured to performing the cleaning.

In some embodiments, management platform 230 may further be configured to obtain, through the object platform, the first image of communal facilities at the first time point, and determine the first cleanliness information of communal facilities based on the first image through a cleanliness determination model. The cleanliness determination model is a machine learning model.

In some embodiments, management platform 230 may further be configured to determine second cleanliness information of communal facilities at the second time point based on first cleanliness information and weather information, construction information, factory information, and traffic information through a cleanliness assessment model. The cleanliness assessment model is a machine learning model.

In some embodiments, management platform 230 may further be configured to, when the second ash deposit degree score is greater than a preset ash deposit degree threshold, perform a plurality of iterative updates on the second ash deposit degree score based on a preset algorithm to obtain an updated second ash deposit degree score, and determine a target ash deposit degree score based on updated second ash deposit degree score.

In some embodiments, the management platform 230 may further be configured to obtain reference ash deposit degree scores of a plurality of reference communal facilities in the target area at the second time point, obtain first facility information of communal facilities and second facility information of a plurality of reference communal facilities, construct graph structure data based on first facility information, second facility information, second ash deposit degree score, and reference ash deposit degree score, determine the nodes corresponding to communal facilities as first nodes to be updated, and for each of plurality of reference communal facilities, determine the node corresponding to a reference communal facility as a second node to be updated when reference ash deposit degree score corresponding to reference communal facility is greater than ash deposit degree threshold. For each of a plurality of rounds of iterative updates, the management platform 230 may further be configured to update first nodes to be updated to obtain updated first nodes to be updated and update second nodes to be updated to obtain updated second nodes to be updated. When a plurality of rounds of iterative updates satisfy a preset iteration stopping condition, the management platform 230 may further be configured to stop a plurality of rounds of iterative updates and use the second deposit ash degree score corresponding to updated first nodes to be updated as updated second deposit ash degree score.

In some embodiments, management platform 230 may further be configured to obtain, through the object platform, the second image of communal facilities at a second time point, and determine, based on the second image, the third cleanliness information of communal facilities, the third cleanliness information including a third ash deposit degree score, determine, based on updated second ash deposit degree score and third ash deposit degree score, target ash degree score.

In some embodiments, management platform 230 may further be configured to obtain target facility information of target communal facilities, and determine cleaning instructions based on target facility information and target cleanliness information.

Figure 6:
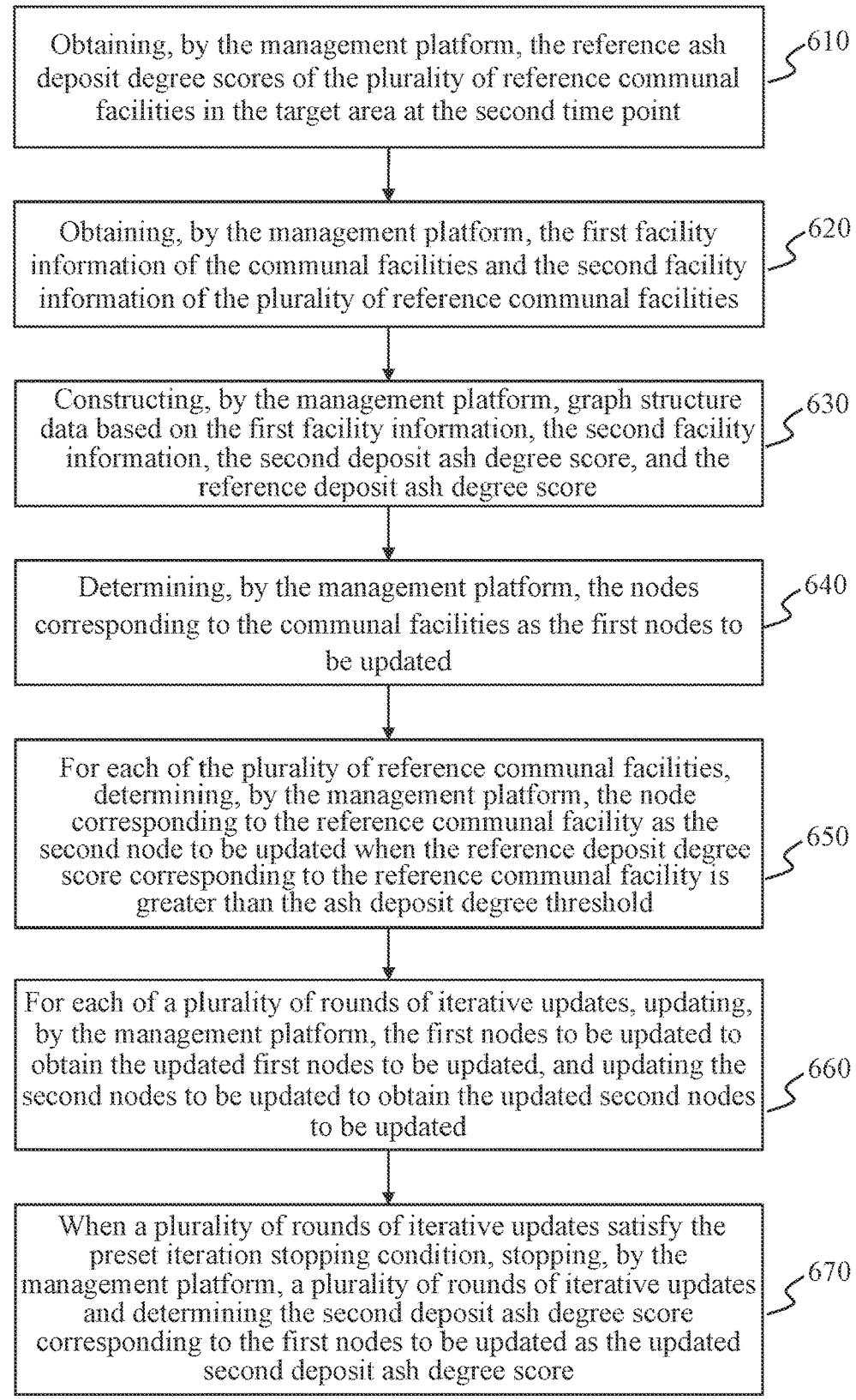
FIG. 6 is an exemplary flowchart of updating a second ash deposit degree score according to some embodiments of the present disclosure.
Figure 7:
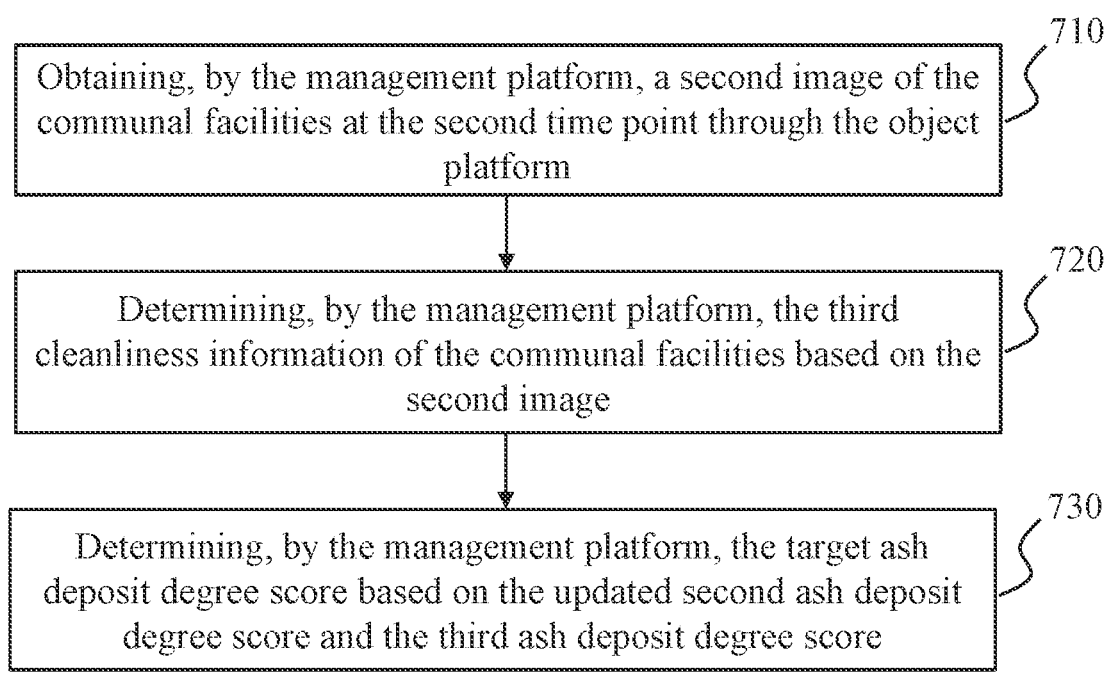
FIG. 7 is an exemplary flowchart of determining a target ash deposit degree score according to some embodiments of the present disclosure.

More descriptions regarding the management platform 230 may be found in FIGS. 3, 6, and 7 and their related descriptions.

The sensor network platform 240 may refer to a platform for unified management of sensing communication among the platforms in the system for communal facilities management in the smart city based on the Internet of Things 200. In some embodiments, the sensor network platform 240 may be configured as a communication network and gateway. The sensor network platform 240 may employ a plurality of sets of gateway servers, or a plurality of sets of smart routers, which is not limited herein.

In some embodiments, the sensor network platform 240 may include a plurality of sensor network sub-platforms. The sensor network sub-platforms also correspond to the object sub-platforms one by one, which may be used for the interaction of information and/or data between the management sub-platforms and the object sub-platforms. For example, the sensor network sub-platform receives instructions for obtaining monitoring information of the target area from the management sub-platform and sends the instructions to the corresponding object sub-platform. The object sub-platform receives the instruction and uploads the monitoring data of the target area to the sensor network sub-platform. The sensor network sub-platform then transmits the received monitoring information of the target area to the corresponding management sub-platform.

The object platform 250 may be a functional device for monitoring and managing communal facilities. In some embodiments, the object platform 250 may be configured as a monitoring device, for example, the monitoring device, the drone, the temperature sensor, etc. In some embodiments, the object platform 250 may also be configured as a cleaning device, for example, a cleaning vehicle, a cleaning robot, etc.

In some embodiments, object platform 250 may include a plurality of object sub-platforms. In some embodiments, the object sub-platform corresponds to the sensor network sub-platform one by one, and the object sub-platform may interact with the sensor network sub-platform for information and/or data. For example, the object sub-platform receives an instruction for obtaining monitoring information of the target area sent by the corresponding sensor network sub-platform, and then uploads the monitoring information of the target area obtained by each monitoring device to the sensor network sub-platform.

In some embodiments of the present disclosure, the system for communal facilities management in the smart city based on the Internet of Things is built by the Internet of Things functional architecture of a plurality of platforms, the management platform is arranged using a combination of a master database and a plurality of sub-platforms, and the service platform, sensor network platform and object platform are arranged using a plurality of sub-platforms, which may ensure the opposability between different classes of data, ensure data classification transmission, traceability and the classified issuance of instruction and processing, causing the structure of the Internet of Things and data processing clear and controllable and facilitating the control and data processing of Internet of Things.

FIG. 3 is an exemplary flowchart illustrating a method for communal facilities management in a smart city based on the Internet of Things according to some embodiments of the present disclosure. In some embodiments, process 300 may be performed by a management platform. As shown in FIG. 3, process 300 includes the following steps.

Step 310, obtaining, by the management platform, the first cleanliness information of the communal facilities in the target area at the first time point and the weather information, construction information, factory information, and traffic information of the target area during the target time period.

The target area may be a geographical area where communal facilities management is required. For example, the target area may be a road, a sidewalk, an indoor area, etc., or a specific coordinate, administrative area, etc. The target area may be determined by manual selection.

The communal facilities may be public buildings or equipment used by the public. For example, the communal facilities may include roads, bridges, green belts, parks, sports stadiums, and the related facilities.

The first time point may be a preset time point. For example, the first time point may be a time point in history, and may also be a current time point. In some embodiments, the first time point may be a time point when the communal facilities have just been cleaned once. The first time point may be determined by manual presetting.

The first cleanliness information may represent information about the cleanliness of the communal facilities at the first time point. In some embodiments, the first cleanliness information may include a first ash deposit degree score, and the first ash deposit degree score represents the cleanliness of the communal facilities at the first time point. The first ash deposit score may be a score within 100, and the greater the first ash deposit score is, the less cleanliness of the communal facilities is, that is, the greater the ash deposit degree of the communal facilities is. In some embodiments, the first cleanliness information may be the cleanliness of the communal facilities after the communal facilities have just been cleaned. For example, the first cleanliness information may be the amount of residual ash deposit on a curb fence after the curb fence is cleaned. In some embodiments, the first cleanliness information may be determined through the network, artificial intelligence, and manual field surveys. In some embodiments, the first cleanliness information may be determined by a cleanliness determination model. The specific descriptions regarding the cleanliness determination model may be found in FIG. 4 and its related description.

In some embodiments, the target time period may be a time period between a first time point and a second time point. The second time point is described later in the description. The weather information during the target time period may be information about precipitation, wind levels, sandstorm, humidity, etc. during the time period. The construction information during the target time period may be the operation of the construction land during the time period. Factory information during the target time period may be the operation of the industrial site during the time period. The traffic information during the target time period may be the road traffic situation during the time period. The above weather information, construction information, factory information, and traffic information may affect the cleanliness of the communal facilities. In some embodiments, the management platform may also obtain other information, for example, agricultural information, demographic information, etc. In some embodiments, the above information may be obtained through the network, for example, weather information is obtained through weather forecasting platforms, traffic information is obtained through traffic related departments, etc.

Step 320, determining, by the management platform, the second cleanliness information of the communal facilities at the second time point based on the first cleanliness information, weather information, construction information, factory information, and traffic information.

The second time point may be another preset time point. In some embodiments, the second time point may be later than the first time point. For example, the second time point may be a time point in the future. The second time point may be determined by manual preset.

The second cleanliness information may be the preliminarily determined cleanliness of communal facilities at the second time point. In some embodiments, the second cleanliness information may include a second ash deposit degree score, which represents the cleanliness of the communal facilities at the second time point. The second ash degree score may be a score within 100, the greater the second ash degree score is, the less cleanliness of the communal facilities are, that is, the greater the ash deposit degree of the communal facilities is. The second ash deposit degree may represent the degree of ash deposit after a period of time when the communal facilities have been cleaned. In some embodiments, the second cleanliness information may be determined by mathematical fitting predictions, artificial intelligence, manual analysis, etc. In some embodiments, the second cleanliness information may be determined by a cleanliness assessment model. The specific descriptions regarding the cleanliness assessment model may be found in FIG. 5 and its related descriptions.

Step 330, determining, by the management platform, the target cleanliness information of the communal facilities at the second time point based on the second cleanliness information.

The target cleanliness information may be the cleanliness information after the second cleanliness information is updated. In some embodiments, the target cleanliness information may include a target ash deposit degree score. The target ash deposit degree score may be a score within 100, and the larger the target ash deposit degree score is, the less clean the communal facilities are, that is, the greater the ash deposit degree of the communal facilities is. In some embodiments, the target cleanliness information may be determined, based on the second cleanliness information, by mathematical fitting, artificial intelligence, etc. In some embodiments, when the second ash deposit degree score is greater than a preset ash deposit degree threshold, a plurality of round of iterative update are performed on the second ash deposit degree score to obtain an updated second ash deposit degree score based on the preset algorithm, and the target ash deposit degree score is determined based on the updated second ash deposit degree score. The specific descriptions regarding performing a plurality of rounds of iterative updates on the second deposit ash degree score based on the preset algorithm may be found in FIG. 6 and its related descriptions. The specific descriptions regarding determining the target ash degree score based on the updated second ash degree score may be found in FIG. 7 and its related descriptions.

Step 340, when the target cleanliness information of the communal facilities meets the preset conditions, determining, by the management platform, the communal facilities as the target communal facilities and determining the cleaning instructions for cleaning the target communal facilities.

The preset condition may be that the target ash deposit degree score of the target cleanliness information reaches the ash deposit degree threshold. The ash deposit degree threshold may be determined by manual setting.

The target communal facilities may be the communal facilities that meet a preset condition. For example, the target communal facilities may be the communal facilities that are predicted to have more ash at a certain future time point. The related information of the target communal facilities may be referred to as target communal facilities information. For example, the target communal facilities information may include information such as location coordinates, cleanliness, and service life of the target communal facilities.

The cleaning instruction may be a related instruction for cleaning the target communal facilities. For example, the cleaning instructions may include whether to clean the communal facilities, the cleaning method, the personnel associated with the cleaning and cleaning vehicle scheduling, the degree of cleaning, etc. The cleaning method may include sweeping, water jet cleaning, wiping, etc. The degree of cleaning may include the water pressure of the water jet cleaning, the wiping area of the wiping, etc.

In some embodiments, the management platform may obtain the target facility information of the target communal facilities, and determine the cleaning instructions based on the target facility information and the target cleanliness information. For example, the management platform may determine the cleaning instructions based on the target facility information and the target cleanliness information through a preset comparison relationship table.

Step 350, sending, by the management platform, cleaning instructions to the object platform through the sensor network platform, and the object platform configured to clean the target communal facilities.

In some embodiments, the object platform may include a device for executing cleaning instructions, for example, a cleaning vehicle, a cleaner dispatch platform, etc., which may be configured to clean the targeted communal facilities.

Through the method for communal facilities management in a smart city based on the Internet of Things described in some embodiments of the present disclosure, the cleaning for communal facilities and greening management based on the Internet of Things may be realized, and the subjective influence brought by manual determination may be reduced. In addition, by predicting the degree of ash deposit of communal facilities at future time points, cleaning instructions and cleaning plan may be allocated in advance to improve cleaning efficiency and avoid unreasonable allocation of cleaning vehicles/cleaning personnel.

Figure 4:
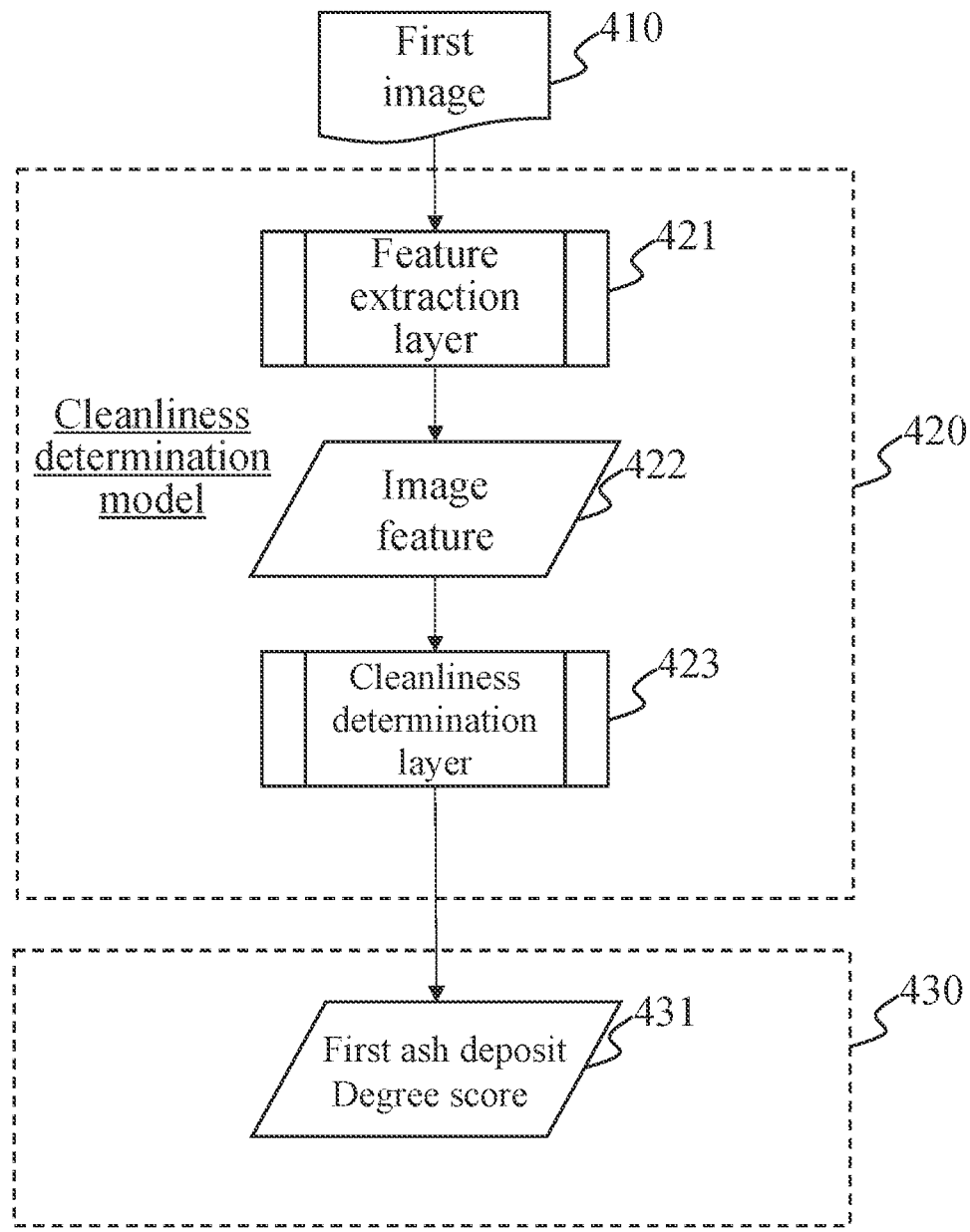
FIG. 4 is a schematic diagram illustrating a cleanliness determination model according to some embodiments of the present disclosure.

FIG. 4 is a schematic diagram illustrating a cleanliness determination model according to some embodiments of the present disclosure.

In some embodiments, the management platform may obtain a first image of the communal facilities at a first time point through the object platform, and determine the first cleanliness information of the communal facilities based on the first image through a cleanliness determination model.

The first image may be an image of the communal facilities at the first time point. The first image may reflect the degree of ash deposit of the communal facilities at the first time point. In some implementations, the first image may be obtained by a camera device (e.g., camera, drone, etc.) of the object platform.

The input of the cleanliness determination model 420 may include a first image 410 and the output of the cleanliness determination model 420 may include a first cleanliness 430. In some embodiments, the output of the cleanliness determination model 420 may be a first ash deposit degree score 431. In some embodiments, the cleanliness determination model 420 may include a feature extraction layer 421 with a cleanliness determination layer 423. The feature extraction layer 421 may be a convolutional neural network model. The input of the feature extraction layer 421 may include a first image 410 and the output of the feature extraction layer 421 may include image features 422. the cleanliness determination layer 423 may be a deep neural network model. The input of the cleanliness determination layer 423 may include image features 422, and the output of the cleanliness determination layer 423 may include a first ash deposit degree score 431.

In some embodiments, the feature extraction layer and the cleanliness determination layer may be obtained by joint training. For example, the initial feature extraction layer and the initial cleanliness determination layer may be trained based on a large number of training samples with labels. The training samples may be historical communal facilities images and the labels may be the first deposit ash degree score corresponding to historical communal facilities images. Specifically, the training sample with the label is input into the initial feature extraction layer, the output of the initial feature extraction layer is input into the initial cleanliness determination layer, and a loss function is constructed based on the output of the initial cleanliness determination layer and the label, and the parameters of the initial feature extraction layer and the initial cleanliness determination layer are iteratively updated based on the loss function until a preset condition is satisfied, and the trained feature extraction layer and the trained cleanliness determination layer are obtained. The preset condition may be that the loss function is less than a threshold, converges, or the training period reaches a threshold.

The cleanliness determination model may intelligently determine the degree of residual ash deposit of communal facilities after the latest cleaning based on the first image, avoiding the subjective influence brought by manual recognition, improving the using efficiency of training samples through joint training, and reducing the count of obtained samples.

Figure 5:
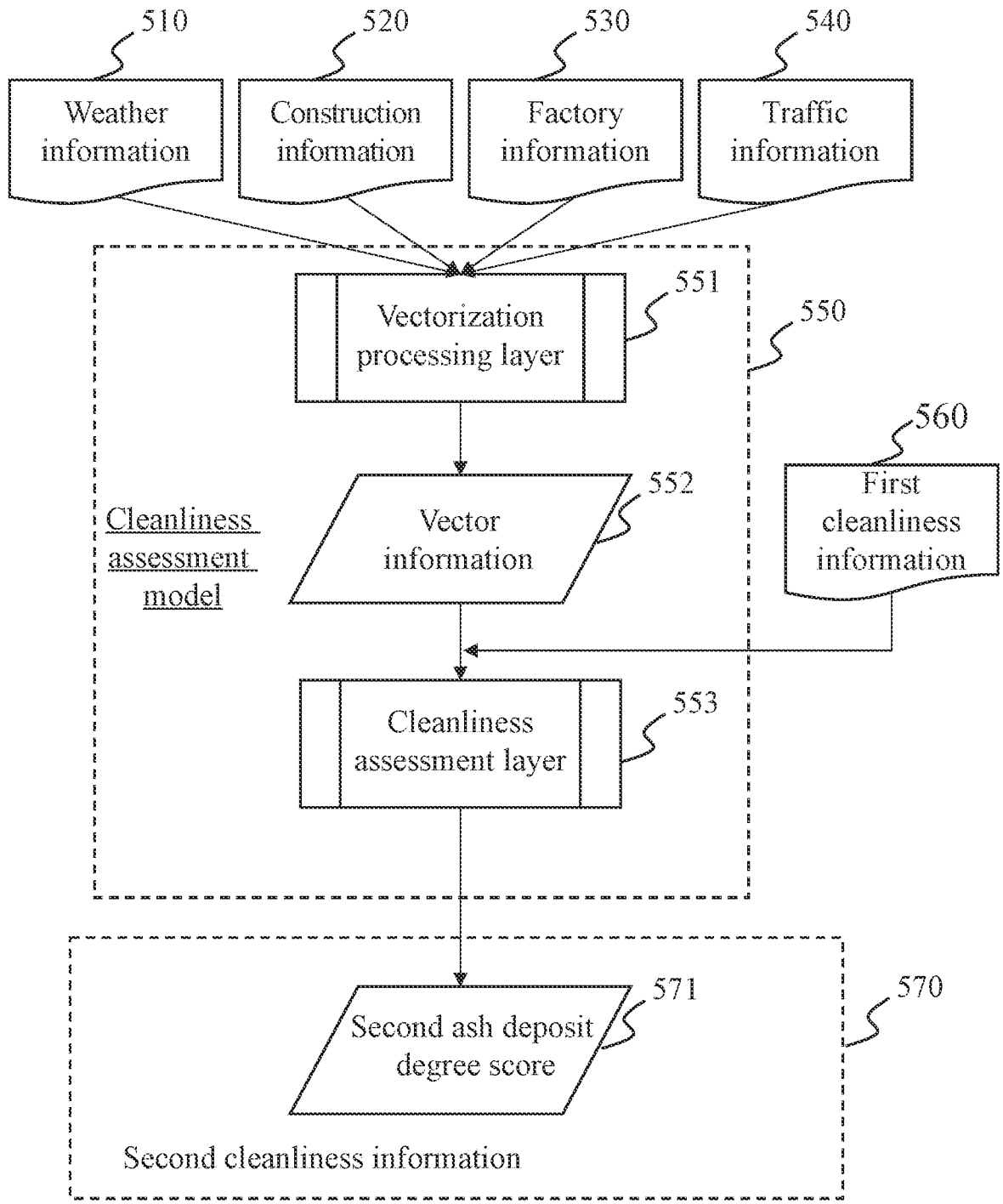
FIG. 5 is a schematic diagram illustrating a cleanliness assessment model according to some embodiments of the present disclosure.

FIG. 5 is a schematic diagram illustrating a cleanliness assessment model according to some embodiments of the present disclosure.

In some embodiments, the management platform may determine the second cleanliness information of the communal facilities at a second time point based on the first cleanliness information and weather information, construction information, factory information, and traffic information through a cleanliness assessment model.

The cleanliness assessment model 550 may be a machine learning model. For example, the cleanliness assessment model 550 may be a neural network model. The inputs of the cleanliness assessment model 550 may include first cleanliness information 560, weather information 510, construction information 520, factory information 530, and traffic information 540, and the outputs of the cleanliness assessment model 550 may include second cleanliness information 570. In some embodiments, the first cleanliness information 560 input to the cleanliness assessment model 550 may be a first ash deposit degree score. In some embodiments, the output of the cleanliness assessment model 550 may include a second ash deposit degree score 571. In some embodiments, the cleanliness assessment model 550 may include a vectorization processing layer 551 and a cleanliness assessment layer 553. The vectorization processing layer 551 may be a BERT model. Inputs of vectorization processing layer 551 may include weather information 510, construction information 520, factory information 530, and traffic information 540, and outputs of the vectorization processing layer 551 may include vector information 552. The vector information 552 may be weather information, construction information, factory information, and traffic information stored in vector form. The cleanliness determination layer 423 may be a deep neural network model. The input of the cleanliness determination layer 423 may include the vector information 552 and the first cleanliness information 560, and the output of the cleanliness determination layer 423 may include a second ash deposit degree score 571.

In some embodiments, the vectorization processing layer and the cleanliness assessment layer may be obtained by joint training. For example, an initial vectorization processing layer and an initial cleanliness assessment layer may be trained based on a large number of training samples with labels. The training samples may be historical first clean information, historical weather information, historical construction information, historical factory information, and historical traffic information, and the labels may be vector information corresponding to the above information and the second ash deposit degree score. Specifically, the training samples with labels are input to the initial vectorization processing layer, the output of the initial vectorization processing layer is input to the initial cleanliness assessment layer, a loss function is constructed based on the output of the initial cleanliness assessment layer and the labels, and the parameters of the initial vectorization processing layer and the initial cleanliness assessment layer are updated iteratively based on the loss function until the preset conditions are satisfied, and the trained vectorization processing layer and the trained cleanliness assessment layer are obtained. The preset conditions may be that the loss function is less than a threshold, converges, or the training period reaches a threshold.

The cleanliness assessment model intelligently predicts the degree of ash deposit of communal facilities after a time period when the communal facilities have been cleaned, so that communal facilities that are prone to ash may be screened out to avoid communal facilities that are not prone to ash occupying cleaning resources. In addition, the prediction process uses machine learning models to improve the accuracy of prediction.

FIG. 6 is an exemplary flowchart of updating a second ash deposit degree score according to some embodiments of the present disclosure. In some embodiments, process 600 may be performed by a management platform. As shown in FIG. 6, process 600 includes the following steps.

Step 610, obtaining, by the management platform, the reference ash deposit degree scores of the plurality of reference communal facilities in the target area at the second time point.

Reference communal facilities may be communal facilities other than the communal facilities to be managed in the target area. For example, when the communal facilities to be managed is a road, the reference communal facilities may be a sidewalk, a curb fence, a street light, etc.

The reference ash deposit degree score may represent the degree of ash deposit of the reference communal facilities. The reference ash degree score may be a score within 100, and the greater the reference ash degree score is, the less cleanliness of the reference communal facilities is, that is, the greater the ash deposit degree of the reference communal facilities is. In some embodiments, the reference ash deposit degree score may be obtained by calling from a location such as a network, database, etc.

Step 620, obtaining, by the management platform, the first facility information of the communal facilities and the second facility information of the plurality of reference communal facilities.

The first facility information may be information about the communal facilities facility to be managed. For example, the first facility information may include the specific location of the communal facilities facility to be managed and the class of the communal facility.

The second facility information may be information about the reference communal facilities. For example, the second facility information may include a distance between the communal facilities to be managed and the reference communal facilities. In some embodiments, the first facility information and the second facility information may be obtained by calling from location such as a network, database, etc.

Step 630, constructing, by the management platform, graph structure data based on the first facility information, the second facility information, the second deposit ash degree score, and the reference deposit ash degree score.

The graph structure data may be a knowledge network graph composed of facility information of each communal facility and the deposit ash degree score of each communal facility.

The management platform may determine the above communal facilities and the reference communal facilities as nodes. The node attributes may include a second ash deposit degree score of the aforementioned communal facilities and a reference ash deposit degree score of each reference communal facility. The node attributes may also include other contents, for example, the facility class of each node, wherein the aforementioned facility class may be determined based on the first facility information or the second facility information.

The management platform may connect nodes whose distance between nodes is less than the distance threshold to form an edge. The distance threshold may be determined by manual setting. It may be understood that the reference communal facility far away the above communal facility and the above communal facility are in different environment, and the reference ash deposit degree of the reference communal facility may not have reference significance. The edge attributes may include the length of the edge and the angle, etc. The aforementioned edge attributes may be determined based on the first facility information and/or the second facility information corresponding to the nodes on both sides of the edges.

The above graph structure data may be configured to link the reference communal facilities with reference value and the communal facilities to be managed, which may show more vividly the relationship between the above communal facilities and each reference communal facility, and avoid interference of the degree of ash deposit of the reference communal facilities that are far away the communal facility on the update process.

Step 640, determining, by the management platform, the nodes corresponding to the communal facilities as the first nodes to be updated.

The first nodes to be updated may be the nodes for which the update is to be performed. For example, the nodes corresponding to the communal facilities are to be managed.

Step 650, for each of the plurality of reference communal facilities, determining, by the management platform, the node corresponding to the reference communal facility as the second node to be updated when the reference deposit degree score corresponding to the reference communal facility is greater than the ash deposit degree threshold.

The second node to be updated may be a node that participates in the update of the first nodes to be updated. For example, the second node to be updated may be the node whose reference ash deposit degree is greater than the ash deposit degree threshold among the nodes corresponding to each of the reference communal facilities interconnected with the aforementioned communal facilities in the aforementioned graph structure data. The ash deposit degree threshold may be determined by manual setting.

Step 660, for each of a plurality of rounds of iterative updates, updating, by the management platform, the first nodes to be updated to obtain the updated first nodes to be updated, and updating the second nodes to be updated to obtain the updated second nodes to be updated.

In some embodiments, the above update process may be carried out by calculating the following equation (1).

$$V'_i = p \times V_i + q \times \Sigma(V_{ik} - R_{ik}) \quad (1)$$

where $V'_i$ denotes the updated second ash deposit degree score corresponding to node i obtained from the current iteration, $V_i$ denotes the updated second ash deposit degree score corresponding to node i obtained from the previous iteration, $V_{ik}$ denotes the reference ash deposit degree score of node k that has an edge relationship with node i, $R_{ik}$ denotes the distance between node i and node k; p and q denote the weights. The weights p and q may be determined by manual setting. The above calculation may realize a plurality of rounds of iterative updates on the second ash deposit degree score to obtain a second ash deposit degree score that better matches the actual situation based on the surrounding reference communal facilities.

Step 670, when a plurality of rounds of iterative updates satisfy the preset iteration stopping condition, stopping, by the management platform, a plurality of rounds of iterative updates and determining the second deposit ash degree score corresponding to the first nodes to be updated as the updated second deposit ash degree score.

A preset iteration stopping condition may be a necessary condition for the iteration to stop. For example, the preset iteration stopping condition may be that the count of iterations reaches a preset number. The preset iteration stopping condition may be determined by manual setting. When the iteration is stopped, the second deposit ash degree score obtained from the latest iteration may be used as the updated second deposit ash degree score.

Through the graph structure data described in some embodiments of the present disclosure, it is possible to achieve a plurality of rounds of iterative updates on the second ash deposit degree score, the update process is based on the surrounding reference communal facilities, and a second ash deposit degree score that is more in line with the actual situation may be obtained (since the ash deposit degree of communal facilities in the same environment tend to be similar).

FIG. 7 is an exemplary flowchart of determining a target ash deposit degree score according to some embodiments of the present disclosure. In some embodiments, process 700 may be performed by a management platform. As shown in FIG. 7, process 700 includes the following steps.

Step 710, obtaining, by the management platform, a second image of the communal facilities at the second time point through the object platform.

The second image may be a real-time image of the communal facilities at a second time point. The second image may reflect the degree of ash deposit of the communal facilities at the second time point. In some implementations, the second image may be obtained by the camera device (e.g., camera, drone, etc.) of the object platform.

Step 720, determining, by the management platform, the third cleanliness information of the communal facilities based on the second image.

The third cleanliness information may be the cleanliness of the communal facilities at the second time point. In some embodiments, the third cleanliness information may include a third ash degree score, which represents the true cleanliness of the communal facilities at the second time point. The greater the third ash degree score is, the less cleanliness of the communal facilities is, that is, the greater the ash degree of the communal facilities is. In some embodiments, the third cleanliness information may be determined by the cleanliness determination model described above. The specific descriptions regarding the cleanliness determination model may be found in FIG. 4 and its related description.

Step 730, determining, by the management platform, the target ash deposit degree score based on the updated second ash deposit degree score and the third ash deposit degree score.

In some embodiments, the target ash degree score may be calculated based on the updated second ash degree score and the third ash degree score. For example, the updated second ash degree score and the third ash degree score are weighted and processed. The weights of the updated second ash deposit degree score and third ash deposit degree score may be preset.

Through the above process 700, it is possible to reconfirm the degree of ash deposit of the communal facilities to be cleaned, avoiding the need to confirm each communal facility and reducing the workload of the confirmation process.

The present disclosure provides a non-transitory computer-readable storage medium in which a computer instruction is stored, and when the computer reads the computer instructions on the storage medium, the computer executes the above method for communal facilities management in the smart city based on the Internet of Things.

The basic concepts have been described above, apparently, for those skilled in the art, the above detailed disclosure is only an example, and does not constitute a limitation of the specification. Although it is not clearly stated here, technical personnel in the art may modify, improve, and amend the present disclosure. The amendments, improvements, and amendments are recommended in the present disclosure, so the amendments, improvements, and amendments still belong to the spirit and scope of the demonstration embodiments of the present disclosure.

At the same time, the present disclosure uses a specific word to describe the embodiments of the present disclosure. For example, "one embodiment", "an embodiment", and/or "some embodiments" means a feature, structure, or feature of at least one embodiment related to the present disclosure. Therefore, it should be emphasized and noted that in the present disclosure, "one embodiment" or "an embodiment" or "an alternative embodiment" that are mentioned in different positions in the present disclosure does not necessarily mean the same embodiment. In addition, some feature, structures, or feature of one or more embodiments in the present disclosure may be properly combined.

In addition, unless the claims are clearly stated, the order of the processing elements and sequences, the use of digital letters, or the use of other names described in this description are not used to limit the order and method of the present disclosure process and method. Although in the above disclosure, some examples are discussed through various examples that are currently considered useful, but it should be understood that this type of details are only explained. The additional claims are not limited to the implementation examples of the disclosure. The requirements are required to cover all the amendments and equivalent combinations that meet the essence and scope of the implementation of the present disclosure. For example, although the implementation of various components described above may be embodied in a hardware device, it may also be implemented as a software only solution, e.g., an installation on an existing server or mobile device.

In the same way, it should be noted that, in order to simplify the statement of the disclosure of the disclosure and help the understanding of one or more embodiments, in the descriptions of the embodiments of the present disclosure, sometimes multiple features will be attributed to one embodiment, figures or its descriptions. However, this disclosure method does not mean that the feature required by the object of this description is more than the feature mentioned in the claims. Rather, claimed subject matter may lie in less than all feature of a single foregoing disclosed embodiment.

Some embodiments use numbers with description of ingredients and attributes. It should be understood that the number used to describe the embodiments are modified by the modifiers "approximately", "approximate" or "generally" in some embodiments. Unless otherwise stated, "approximately", "approximate", or "generally" indicates that the number allows ±20% of changes. Correspondingly, in some embodiments, the value parameters used in the specification and claims are approximate values. The approximate value can be changed according to the feature of individual embodiments. In some embodiments, the numerical parameters should consider the effective digits specified and use the method of general digits. Although number and parameters used to confirm the range and parameters of its range breadth in some embodiments of the present disclosure are approximate values, in the specific embodiment, the setting of such values is as accurate as possible within the feasible range.

Each patent, patent application, patent application public and other materials cited for the present disclosure, such as articles, books, instructions, publications, documents, etc., are hereby incorporated into this disclosure as a reference. Except for the inconsistent content of the present disclosure or the application history documents, the documents that limit the broadest scope of claims in this specification (currently or hereafter attached to this specification) are also excluded. It should be explained that if the use of description, definition, and/or terminology in this disclosure is inconsistent or conflict with the content described in this disclosure, the use of the description, definition and/or terms of the present disclosure shall prevail.

Finally, it should be understood that the embodiments described in the present disclosure are only used to illustrate the principle of the embodiments of this description. Other deformation may also belong to the scope of the present disclosure. Therefore, as an example, rather than restrictions, the replacement configuration of the embodiment of the present disclosure may be consistent with the teaching of the present disclosure. Correspondingly, the embodiments of the present disclosure are not limited to the implementation and description of the present disclosure.

What is claimed is:

1. A method for communal facilities management in a smart city based on an Internet of Things, wherein the method is applied to a management platform, comprising:
obtaining first cleanliness information of the communal facilities in a target area at a first time point, wherein the first time point is a time point when the communal facilities were cleaned for last time; obtaining weather information, construction information, factory information, and traffic information of the target area during a target time period, wherein the target time period is a time period between the first time point and a second time point; wherein the first cleanliness information includes a first ash deposit degree score, and the first ash deposit degree score represents cleanliness of the communal facilities at the first time point;
determining second cleanliness information of the communal facilities at the second time point based on the first cleanliness information, the weather information, the construction information, the factory information, and the traffic information through a cleanliness assessment model; wherein the second cleanliness information includes a second ash deposit degree score, and the second ash deposit degree score represents cleanliness of the communal facilities at the second time point; wherein the cleanliness assessment model is a machine learning model, and the cleanliness assessment model includes at least a vectorization processing layer and a cleanliness assessment layer, wherein
an input of the vectorization processing layer includes the weather information, the construction information, the factory information, and the traffic information, and an output of the vectorization processing layer includes vector information;
an input of the cleanliness assessment layer includes the vector information and the first cleanliness information, and an output of the cleanliness assessment layer includes the second ash deposit degree score;
wherein the vectorization processing layer and the cleanliness assessment layer are obtained by joint training based on training samples and labels, the training samples include historical first clean information, historical weather information, historical construction information, historical factory information, and historical traffic information, and the labels include the second ash deposit degree score; wherein the joint training includes:
inputting the training samples to an initial vectorization processing layer;
inputting an output of the initial vectorization processing layer to an initial cleanliness assessment layer;
generating a loss function based on an output of the initial cleanliness assessment layer and the labels;
updating iteratively parameters of the initial vectorization processing layer and the initial cleanliness assessment layer based on the loss function until preset conditions are satisfied, wherein the preset conditions include that the loss function is less than a threshold, converges, or a training period reaches a period threshold;
determining, based on the second cleanliness information, target cleanliness information of the communal facilities at the second time point; wherein the target cleanliness information includes a target ash deposit degree score, wherein the determining, based on the second cleanliness information, target cleanliness information of the communal facilities at the second time point includes:
when the second ash deposit degree score is greater than a preset ash deposit degree threshold, performing a plurality of rounds of iterative updates on the second ash deposit degree score based on a preset algorithm to obtain an updated second ash deposit degree score, including:
obtaining reference ash deposit degree scores of a plurality of reference communal facilities in the target area at the second time point;
obtaining first facility information of the communal facilities and second facility information of the plurality of reference communal facilities;
constructing graph structure data based on the first facility information, the second facility information, the second ash deposit degree score, and the reference ash deposit degree scores;
determining nodes corresponding to the communal facilities as first nodes to be updated;
for each of the plurality of reference communal facilities, determining a node corresponding to a reference communal facility as a second node to be updated when a reference ash deposit degree score corresponding to the reference communal facility is greater than an ash deposit level threshold;
for each of the plurality of rounds of iterative updates, updating the first nodes to be updated to obtain updated first nodes to be updated, and updating the second nodes to be updated to obtain updated second nodes to be updated;
when the plurality of rounds of iterative updates satisfies a preset iteration stopping condition, stopping the plurality of rounds of iterative updates, and determining the second ash deposit degree score corresponding to the updated first nodes to be updated as the updated second ash deposit degree score;
determining, based on the updated second ash deposit degree score, the target ash deposit degree score;
determining the communal facilities as target communal facilities when the target cleanliness information of the communal facilities satisfies a preset condition, and determining cleaning instructions for cleaning the target communal facilities; and
sending the cleaning instructions to an object platform through a sensor network platform, wherein the object platform is configured to clean the target communal facilities.

2. The method of claim 1, wherein the obtaining first cleanliness information of the communal facilities in a target area at a first time point includes:
obtaining, through the object platform, a first image of the communal facilities at the first time point; and
determining the first cleanliness information of the communal facilities based on the first image through a cleanliness determination model, wherein the cleanliness determination model is a machine learning model, the cleanliness determination model includes a feature extraction layer and a cleanliness determination layer, an input of the feature extraction layer includes the first image, an output of the feature extraction layer includes image features, an input of the cleanliness determination layer includes the image features, and an output of the cleanliness determination layer includes the first ash deposit degree score.

3. The method of claim 1, wherein the determining, based on the updated second ash deposit degree score, the target ash deposit degree score includes:
   obtaining, through the object platform, a second image of the communal facilities at the second time point;
   determining, by processing the second image based on the feature extraction layer of the cleanliness determination model, second image features; determining, by processing the second image features based on the cleanliness determination layer of the cleanliness determination model, third cleanliness information of the communal facilities, wherein third cleanliness information includes a third ash deposit degree score; and
   determining, by weighting and processing the updated second ash deposit degree score and the third ash deposit degree score, the target ash deposit degree score.

4. The method of claim 1, wherein the determining cleaning instructions for cleaning the target communal facilities includes:
   obtaining target facility information of the target communal facilities; and
   determining, based on the target facility information and the target cleanliness information, the cleaning instructions.

5. A system for communal facilities management in a smart city based on an Internet of Things, comprising a user platform, a service platform, a management platform, a sensor network platform, and an object platform, wherein the system further comprises computer-readable storage medium storing a computer instruction, when executed by at least one processor of a computer, the at least one processor is directed to cause the system to:
   obtain first cleanliness information of the communal facilities in a target area at a first time point, wherein the first time point is a time point when the communal facilities were cleaned for last time; obtain weather information, construction information, factory information, and traffic information of the target area during a target time period, wherein the target time period is a time period between the first time point and a second time point; wherein the first cleanliness information includes a first ash deposit degree score, and the first ash deposit degree score represents cleanliness of the communal facilities at the first time point;
   determine second cleanliness information of the communal facilities at the second time point based on the first cleanliness information, the weather information, the construction information, the factory information, and the traffic information through a cleanliness assessment model; wherein the second cleanliness information includes a second ash deposit degree score, and the second ash deposit degree score represents cleanliness of the communal facilities at the second time point; wherein the cleanliness assessment model is a machine learning model, and the cleanliness assessment model includes at least a vectorization processing layer and a cleanliness assessment layer, wherein
   an input of the vectorization processing layer includes the weather information, the construction information, the factory information, and the traffic information, and an output of the vectorization processing layer includes vector information;
   an input of the cleanliness assessment layer includes the vector information and the first cleanliness information, and an output of the cleanliness assessment layer includes the second ash deposit degree score;
   wherein the vectorization processing layer and the cleanliness assessment layer are obtained by joint training based on training samples and labels, the training samples include historical first clean information, historical weather information, historical construction information, historical factory information, and historical traffic information, and the labels include the second ash deposit degree score; wherein the joint training includes:
     inputting the training samples to an initial vectorization processing layer;
     inputting an output of the initial vectorization processing layer to an initial cleanliness assessment layer;
     generating a loss function based on an output of the initial cleanliness assessment layer and the labels;
     updating iteratively parameters of the initial vectorization processing layer and the initial cleanliness assessment layer based on the loss function until preset conditions are satisfied, wherein the preset conditions include that the loss function is less than a threshold, converges, or a training period reaches a period threshold;
   determine, based on the second cleanliness information, target cleanliness information of the communal facilities at the second time point; wherein the target cleanliness information includes a target ash deposit degree score, wherein the determining, based on the second cleanliness information, target cleanliness information of the communal facilities at the second time point includes:
     when the second ash deposit degree score is greater than a preset ash deposit degree threshold, performing a plurality of rounds of iterative updates on the second ash deposit degree score based on a preset algorithm to obtain an updated second ash deposit degree score, including obtaining reference ash deposit degree scores of a plurality of reference communal facilities in the target area at the second time point;
     obtaining first facility information of the communal facilities and second facility information of the plurality of reference communal facilities;
     constructing graph structure data based on the first facility information, the second facility information, the second ash deposit degree score, and the reference ash deposit degree scores;
     determining nodes corresponding to the communal facilities as first nodes to be updated;
     for each of the plurality of reference communal facilities, determining a node corresponding to a reference communal facility as a second node to be updated when a reference ash deposit degree score corresponding to the reference communal facility is greater than an ash deposit level threshold;
     for each of the plurality of rounds of iterative updates, updating the first nodes to be updated to obtain updated first nodes to be updated, and updating the second nodes to be updated to obtain updated second nodes to be updated;

when the plurality of rounds of iterative update satisfies a preset iteration stopping condition, stopping the plurality of rounds of iterative update, and determining the second ash deposit degree score corresponding to the updated first nodes to be updated as the updated second ash deposit degree score;

determining, based on the updated second ash deposit degree score, the target ash deposit degree score;

determine the communal facilities as target communal facilities when the target cleanliness information of the communal facilities satisfies a preset condition, and determine cleaning instructions for cleaning the target communal facilities; and send the cleaning instructions to the object platform through the sensor network platform, wherein the object platform is configured to clean the target communal facilities.

6. A non-transitory computer-readable storage medium in which a computer instruction is stored, wherein when the computer instruction is executed by a computer, the computer implements a method for communal facilities management in a smart city, the method comprising:

obtaining first cleanliness information of the communal facilities in a target area at a first time point, wherein the first time point is a time point when the communal facilities were cleaned for last time; obtaining weather information, construction information, factory information, and traffic information of the target area during a target time period, wherein the target time period is a time period between the first time point and a second time point; wherein the first cleanliness information includes a first ash deposit degree score, and the first ash deposit degree score represents cleanliness of the communal facilities at the first time point;

determining second cleanliness information of the communal facilities at the second time point based on the first cleanliness information, the weather information, the construction information, the factory information, and the traffic information through a cleanliness assessment model; wherein the second cleanliness information includes a second ash deposit degree score, and the second ash deposit degree score represents cleanliness of the communal facilities at the second time point; wherein the cleanliness assessment model is a machine learning model, and the cleanliness assessment model includes at least a vectorization processing layer and a cleanliness assessment layer, wherein an input of the vectorization processing layer includes the weather information, the construction information, the factory information, and the traffic information, and an output of the vectorization processing layer includes vector information;

an input of the cleanliness assessment layer includes the vector information and the first cleanliness information, and an output of the cleanliness assessment layer includes the second ash deposit degree score;

wherein the vectorization processing layer and the cleanliness assessment layer are obtained by joint training based on training samples and labels, the training samples include historical first clean information, historical weather information, historical construction information, historical factory information, and historical traffic information, and the labels include the second ash deposit degree score; wherein the joint training includes:

inputting the training samples to an initial vectorization processing layer;

inputting an output of the initial vectorization processing layer to an initial cleanliness assessment layer;

generating a loss function based on an output of the initial cleanliness assessment layer and the labels;

updating iteratively parameters of the initial vectorization processing layer and the initial cleanliness assessment layer based on the loss function until preset conditions are satisfied, wherein the preset conditions include that the loss function is less than a threshold, converges, or a training period reaches a period threshold;

determining, based on the second cleanliness information, target cleanliness information of the communal facilities at the second time point; wherein the target cleanliness information includes a target ash deposit degree score, wherein the determining, based on the second cleanliness information, target cleanliness information of the communal facilities at the second time point includes:

when the second ash deposit degree score is greater than a preset ash deposit degree threshold, performing a plurality of rounds of iterative updates on the second ash deposit degree score based on a preset algorithm to obtain an updated second ash deposit degree score, including:

obtaining reference ash deposit degree scores of a plurality of reference communal facilities in the target area at the second time point;

obtaining first facility information of the communal facilities and second facility information of the plurality of reference communal facilities;

constructing graph structure data based on the first facility information, the second facility information, the second ash deposit degree score, and the reference ash deposit degree scores;

determining nodes corresponding to the communal facilities as first nodes to be updated;

for each of the plurality of reference communal facilities, determining a node corresponding to a reference communal facility as a second node to be updated when a reference ash deposit degree score corresponding to the reference communal facility is greater than an ash deposit level threshold;

for each of the plurality of rounds of iterative updates, updating the first nodes to be updated to obtain updated first nodes to be updated, and updating the second nodes to be updated to obtain updated second nodes to be updated;

when the plurality of rounds of iterative updates satisfies a preset iteration stopping condition, stopping the plurality of rounds of iterative updates, and determining the second ash deposit degree score corresponding to the updated first nodes to be updated as the updated second ash deposit degree score;

determining, based on the updated second ash deposit degree score, the target ash deposit degree score;

determining the communal facilities as target communal facilities when the target cleanliness information of the communal facilities satisfies a preset condition, and determining cleaning instructions for cleaning the target communal facilities; and sending the cleaning instructions to an object platform through a sensor network platform, wherein the object platform is configured to clean the target communal facilities.

* * * * *